US010901760B2

(12) United States Patent
Grochocki, Jr. et al.

(10) Patent No.: US 10,901,760 B2
(45) Date of Patent: Jan. 26, 2021

(54) VIEW AUGMENTATION IN MULTISCREEN ENVIRONMENT

(71) Applicant: Microsoft Technology Licensing, LLC, Redmond, WA (US)

(72) Inventors: David Grochocki, Jr., Seattle, WA (US); Ana Lilia Otero Diaz, Woodinville, WA (US); Kshitij Sethi, Seattle, WA (US); Jeff West, Sammamish, WA (US); Felix Andrew, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 67 days.

(21) Appl. No.: 15/912,369

(22) Filed: Mar. 5, 2018

(65) Prior Publication Data
US 2019/0272186 A1 Sep. 5, 2019

(51) Int. Cl.
| | |
|---|---|
| *G06F 9/54* | (2006.01) |
| *G06F 3/048* | (2013.01) |
| *G06F 9/451* | (2018.01) |
| *G06F 3/14* | (2006.01) |
| *G06F 9/46* | (2006.01) |

(Continued)

(52) U.S. Cl.
CPC ......... *G06F 9/452* (2018.02); *G01C 21/3679* (2013.01); *G06F 3/1423* (2013.01); *G06F 3/1446* (2013.01); *G06F 9/461* (2013.01); *G09G 5/003* (2013.01); *G06F 1/1616* (2013.01);

(Continued)

(58) Field of Classification Search
CPC ... G06F 9/54; G06F 9/00; G06F 3/048; G06F 3/00; G06F 16/00; A61B 5/7445
See application file for complete search history.

(56) References Cited

U.S. PATENT DOCUMENTS 9,152,477 B1 * 10/2015 Campbell ................. G06F 9/54
9,632,851 B1 * 4/2017 Johansson ............... G06F 9/543
(Continued)

FOREIGN PATENT DOCUMENTS

WO 2018010366 A1 1/2018

OTHER PUBLICATIONS

"International Search Report and Written Opinion Issued in PCT Application No. PCT/US2019/018854", dated Jun. 28, 2019, 30 Pages.

*Primary Examiner* — Hugo Molina
(74) *Attorney, Agent, or Firm* — Davin Chin; Chin IP, PLLC

(57) ABSTRACT

The disclosed technology is generally directed to multiscreen environments. In one example of the technology, a registry is maintained. The registry includes a plurality of context schemas. Each context schema in the plurality of context schemas includes a context schema input and a context schema output. Context data is received from a first application. The context data includes at least one of a context schema input that is associated with view augmentation in a multiscreen environment or a context schema output that is associated with view augmentation in a multiscreen environment. It is determined whether the context data is valid based, at least in part, on the registry. In response to determining that the context data is valid, the context data is forwarded to at least a second application. The second application is separate from the first application.

20 Claims, 12 Drawing Sheets

(51) Int. Cl.
  *G09G 5/00* (2006.01)
  *G01C 21/36* (2006.01)
  *G06F 1/16* (2006.01)

(52) U.S. Cl.
  CPC ....... *G06F 1/1641* (2013.01); *G09G 2356/00* (2013.01); *G09G 2380/02* (2013.01)

(56) References Cited

U.S. PATENT DOCUMENTS

| | | |
|---|---|---|
| 2005/0003804 A1 | 1/2005 | Huomo et al. |
| 2006/0200834 A1 | 9/2006 | Cukierman et al. |
| 2011/0307461 A1* | 12/2011 | Borton ................ G06F 16/951 707/706 |
| 2012/0066581 A1* | 3/2012 | Spalink ................ G06F 40/169 715/232 |
| 2012/0081270 A1 | 4/2012 | Gimpl et al. |
| 2013/0226878 A1* | 8/2013 | Sankaranarayanan ...................... G06F 16/2365 707/689 |
| 2013/0339980 A1* | 12/2013 | Meshar ................ G06F 9/544 719/312 |
| 2014/0223448 A1* | 8/2014 | Varoglu ................ G06F 16/29 719/313 |
| 2015/0312633 A1 | 10/2015 | Masciarotte |
| 2015/0362325 A1 | 12/2015 | Shin et al. |
| 2016/0205427 A1 | 7/2016 | Yoon et al. |
| 2016/0259840 A1 | 9/2016 | Zheng et al. |
| 2017/0163481 A1* | 6/2017 | Figueroa ............. H04L 41/0883 |
| 2017/0220307 A1* | 8/2017 | Da Silva Ramos ...................... G06F 3/04817 |
| 2017/0288614 A1* | 10/2017 | Obiya .................... H03F 3/195 |
| 2018/0007099 A1 | 1/2018 | Ein-gil et al. |
| 2018/0173317 A1* | 6/2018 | Kinnunen ............. G06F 16/176 |
| 2018/0285172 A1* | 10/2018 | Turner ................ G06F 9/546 |
| 2018/0330329 A1* | 11/2018 | Anima ................ G06F 3/0484 |

* cited by examiner

VIEW AUGMENTATION IN MULTISCREEN ENVIRONMENT

BACKGROUND

Multimonitor environments exist today, where, for example, various windowing mechanisms may exist. Tablet interfaces may have side-by-side and/or picture-in-picture interfaces that allow multiple app instances to run. Some cars may be manufactured with multiple digital screens, e.g., a display on the dashboard and also a separate virtual cockpit with speedometer and other dials.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to multiscreen environments. In one example of the technology, a registry is maintained. In some examples, the registry includes a plurality of context schemas. In some examples, each context schema in the plurality of context schemas includes a context schema input and a context schema output. In some examples, context data is received from a first application. In some examples, the context data includes at least one of a context schema input that is associated with view augmentation in a multiscreen environment or a context schema output that is associated with view augmentation in a multiscreen environment. In some examples, it is determined whether the context data is valid based, at least in part, on the registry. In some examples, in response to determining that the context data is valid, the context data is forwarded to at least a second application that is separate from the first application.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
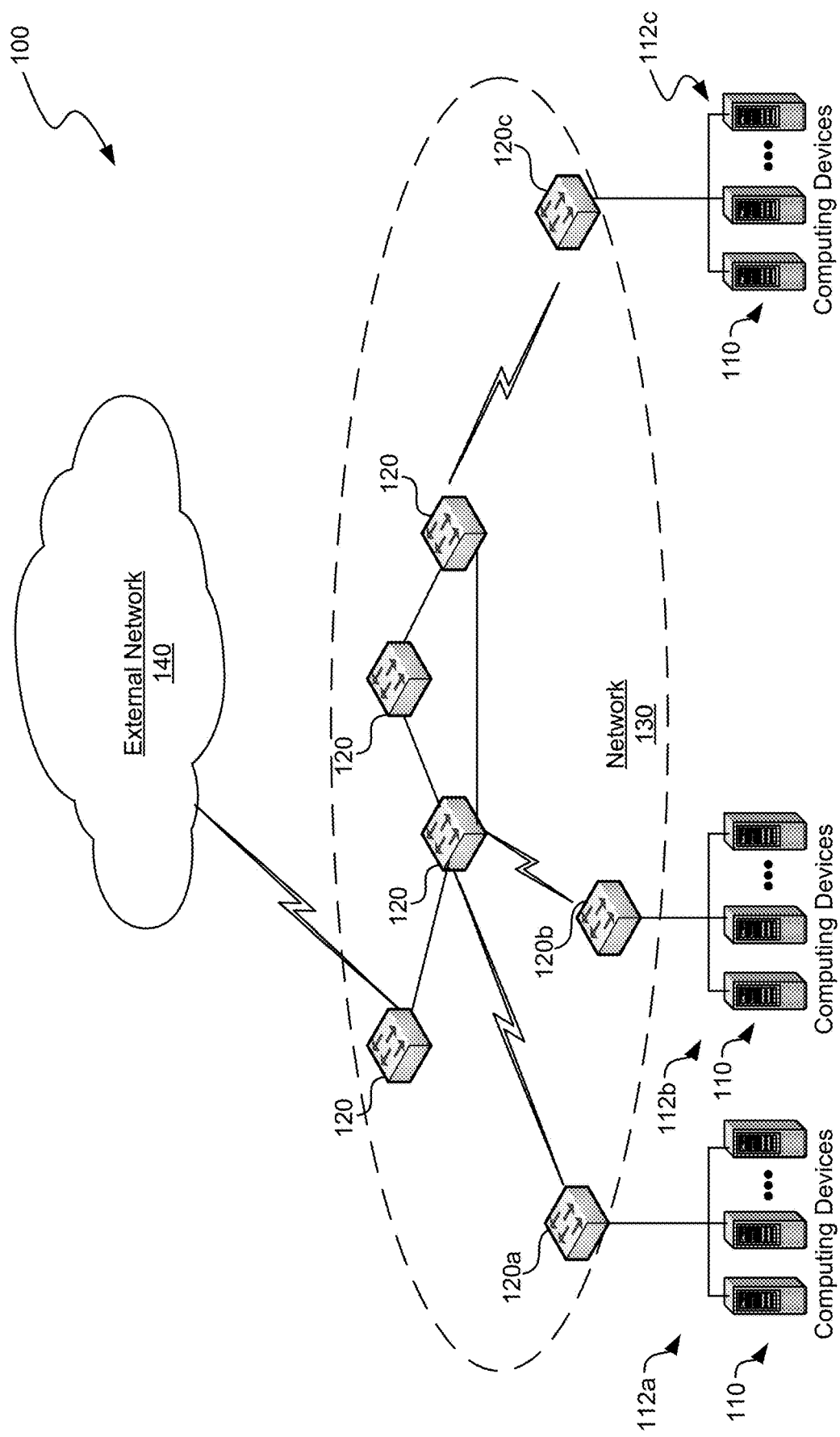
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to multiscreen environments. In one example of the technology, a registry is maintained. In some examples, the registry includes a plurality of context schemas. In some examples, each context schema in the plurality of context schemas includes a context schema input and a context schema output. In some examples, context data is received from a first application. In some examples, the context data includes at least one of a context schema input that is associated with view augmentation in a multiscreen environment or a context schema output that is associated with view augmentation in a multiscreen environment. In some examples, it is determined whether the context data is valid based, at least in part, on the registry. In some examples, upon determining that the context data is valid, the context data is forwarded to at least a second application that is separate from the first application.

Applications on a multi-screen device can register contexts schemas that includes inputs and outputs. Using defined APIs for the context schema and the context schema registry, the applications can security pass information back and forth between each other.

For example, if the "Gas Buddy" app has registered for the location-aware system capability, and a mapping application is navigating, the "Gas Buddy" application is notified that the user is navigating, and the "Gas Buddy" app can automatically launch on the second screen to provide contextual information about gas prices nearby. In some examples, additional context may also be used. For example, the "Gas Buddy" application might only pop up on the second screen if it is known that the user is low on fuel. Conversely, a mapping application that is waiting for notifications from apps that can be augmented with mapping data. If, for example, the "Jimmy John's" app notifies the mapping application that it has useful location information to display, the mapping application can automatically open to show nearby Jimmy John's locations on a map.

In the context of a single application, the relationship can exist as discrete instances of the app or within one instance of the app. Taking a mapping application as an example, while in compass mode, the second screen could be oriented to show a live view of what is in front of the user with augmented reality (AR) markers displaying additional information about the places around the user. While navigating, a full set of upcoming maneuvers can be displayed on the second screen. Additionally, applications that register for the appropriate contexts, instead of launching and displaying views on the second screen, may provide information to the mapping application to display on their own. For example, while in that same compass mode, the Yelp app may serve as the provider for data to be displayed in the AR view.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices no may be individually configured to provide computing, storage, and/ or other suitable computing services.

Although FIG. 1 shows an example of a device in a network environment, not all examples of the disclosure are network devices. That is, some examples of the disclosure are capable of operating as connected devices that communicate with one or more networks, and some example of the disclosure are not capable of connecting to a network.

Illustrative Computing Device

Figure 2:
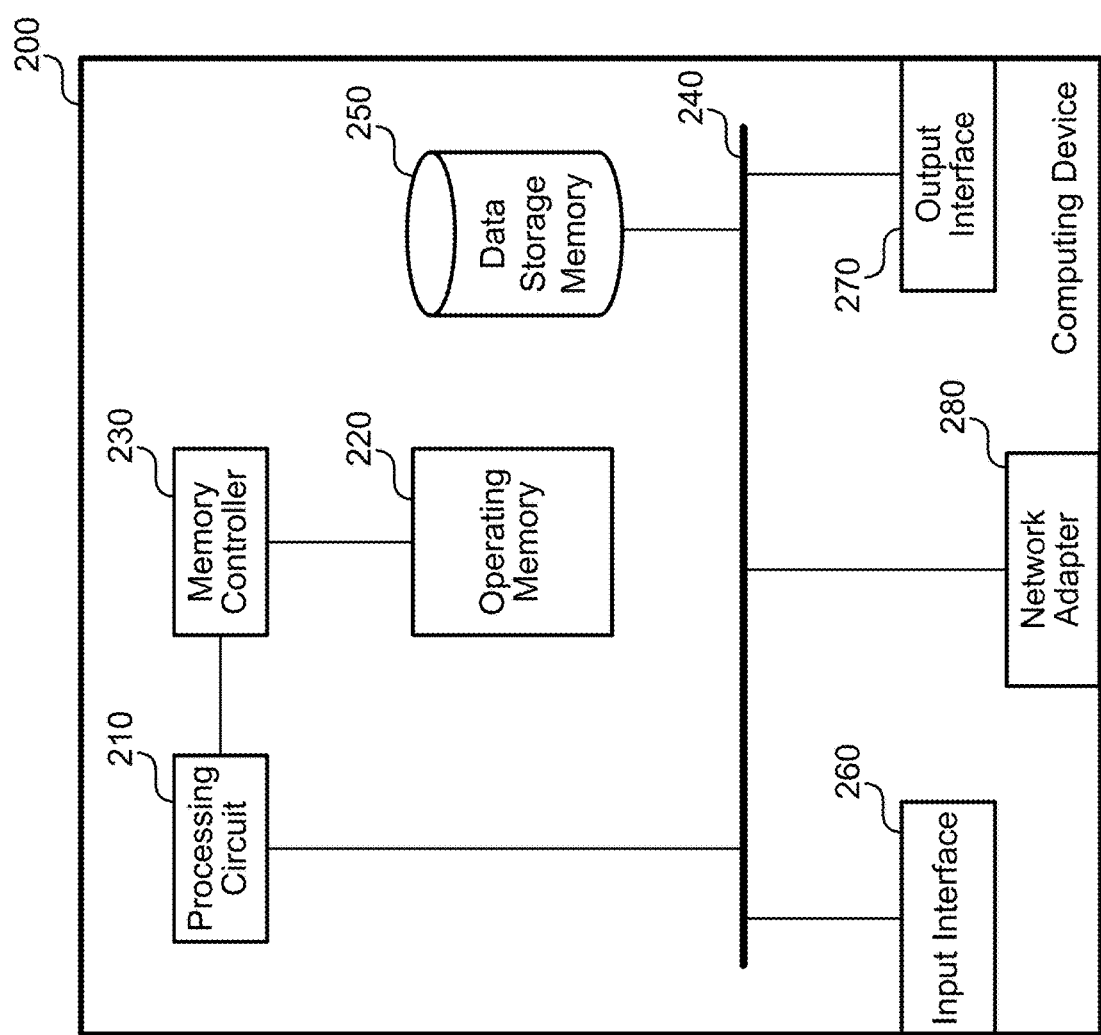
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate (DDR4) memory, $3^{rd}$ generation double data rate (DDR3) memory, other dynamic random-access memory (DRAM), High Bandwidth Memory (HBM), Hybrid Memory Cube memory, 3 D-stacked memory, static random-access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
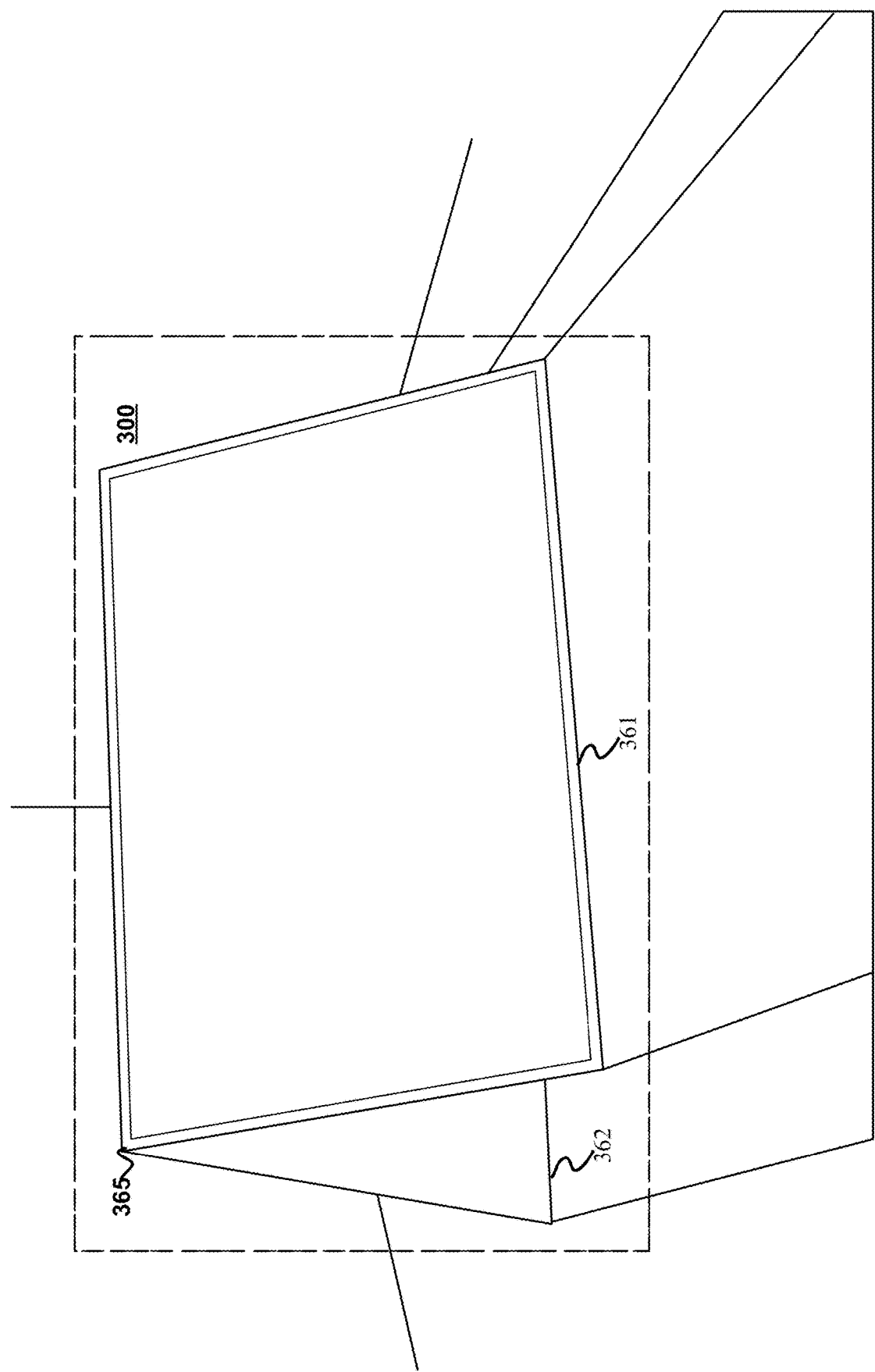
FIG. 3 is a block diagram illustrating an example of a device.

FIG. 3 is a block diagram illustrating an example of a device (300). Device 300 may include screen 361 and screen 362. Some examples of device 300 include hinge 365, and other examples of device 300 do not include a hinge. Although not visible in FIG. 3, device 300 may also include a controller which may be disposed inside screen 361, disposed inside screen 362, or may have one portion inside screen 361 and another portion inside screen 362. In some examples, one portion of a controller is disposed inside screen 361, another portion of the controller is disposed inside screen 362, and the two portions are connected through hinge 365. Device 300 may also include many other components not shown, such as at least one speaker, a GPS, a plug for a power adapter, and/or the like.

As shown, in the example illustrated, device 300 is a two-screen device in which screen 361 is physically coupled to screen 362 via hinge 365. In some examples, device 300 may be placed in a "tent" mode as illustrated in FIG. 3, in which device 300 is physically supported on a flat surface with the bottom of screen 361 and the bottom of screen 362 in contact with the flat surface and supporting the weight of device 300.

In some examples, screen 362 is physically coupled to the screen 361 in such a way that the screen 361 and screen 362 are foldable into a plurality of different physical configurations. In some examples, device 300 is a foldable device, which is capable of being placed in "tent" mode or being folded so that screen 361 and front screen 362 collapse to touch each either such that device 300 is closed so as to be easily transportable. For instance, a user may use device 300 at home, and the user may also bring device 300 with the user while traveling, and folding device 300 closed makes it easy to transport device 300 while traveling. In some examples, folding may be accomplished via hinge 365, which may also allow device 300 to remain standing in the open "tent" position. Other examples of device 300 do not include a hinge, and the folding and "tent" modes are accomplished in another suitable manner.

In some examples, device 300 may also be placed in a mode in which screen 361 and screen 362 are side-by-side, so that screen 361 and screen 362 are both facing the same direction. This is one useful example of a multiscreen environment in which views are automatically or programmatically augmented with additional data to enable greater productivity, additional information in a useful format, and/or other benefits.

Applications on device 300 can register contexts schemas that includes inputs and outputs. Using defined APIs for the context schema and the context schema registry, the applications can security pass information back and forth between each other.

For example, if the "Gas Buddy" app has registered for the location-aware system capability, and a mapping application is navigating on screen 361, the "Gas Buddy" application is notified that the user is navigating, and the "Gas Buddy" app can automatically launch on the screen 362 to provide contextual information about gas prices nearby. In some examples, additional context may also be used. For example, the "Gas Buddy" application might only pop up on screen 362 if it is known that the user is low on fuel. Conversely, a mapping application that is waiting for notifications from apps that can be augmented with mapping data. If, for example, the "Jimmy John's" app notifies the mapping application that it has useful location information to display, the mapping application can automatically open to show nearby Jimmy John's locations on a map.

In the context of a single application, the relationship can exist as discrete instances of the app or within one instance of the app. Taking a mapping application as an example, while in compass mode on screen 361, the screen 362 could be oriented to show a live view of what is in front of the user with augmented reality (AR) markers displaying additional information about the places around the user. While navigating, a full set of upcoming maneuvers can be displayed on the second screen. Additionally, applications that register for the appropriate contexts, instead of launching and displaying views on the screen 362, may provide information to the mapping application to display on their own. For example, while in that same compass mode, the Yelp app may serve as the provider for data to be displayed in the AR view.

Although FIG. 3 illustrates an example of a two-screen device in which examples of the disclosure may be practice, other examples of the disclosure may be employed in any suitable multiscreen environment.

For instance, some examples may include a device with three or more screens, or an environment with three or more screens, whether with two applications or with three or more applications being involved. Additionally, in various examples, three or more applications may be involved, whether with three or more screens, or with two screens.

As an example that includes three screens, a video player application may be playing on a first screen, with an application with movie information showing movie details associated with the movie being played by the video application on a second screen, and a Twitter application displaying a twitter feed associated with the movie being played on a third screen (e.g., the twitter feed for a director, actor, studio, or the like associated with the movie being played.)

As an example that involves two screens with three or more applications providing data, a video playing application may be playing a movie on one screen, with a second view provided by the video player application on a second screen that aggregates trending social media posts provided from installed apps like the Twitter app, Facebook app, and Instagram app, and also provides some fun movie trivia from the IMDB app.

As discussed above, the two screens of the device may be physically coupled together and enabled to be placed in various modes, including "tent" mode, a "side-by-side" mode, and a "folded" mode in different ways in different examples, where these modes are physical configurations into which the two screens of the device are foldable into. In some examples, the two screens are physically coupled together via a hinge. In some examples, the device, including the two screens, together act as a single foldable panel which folds in half.

Figure 4:
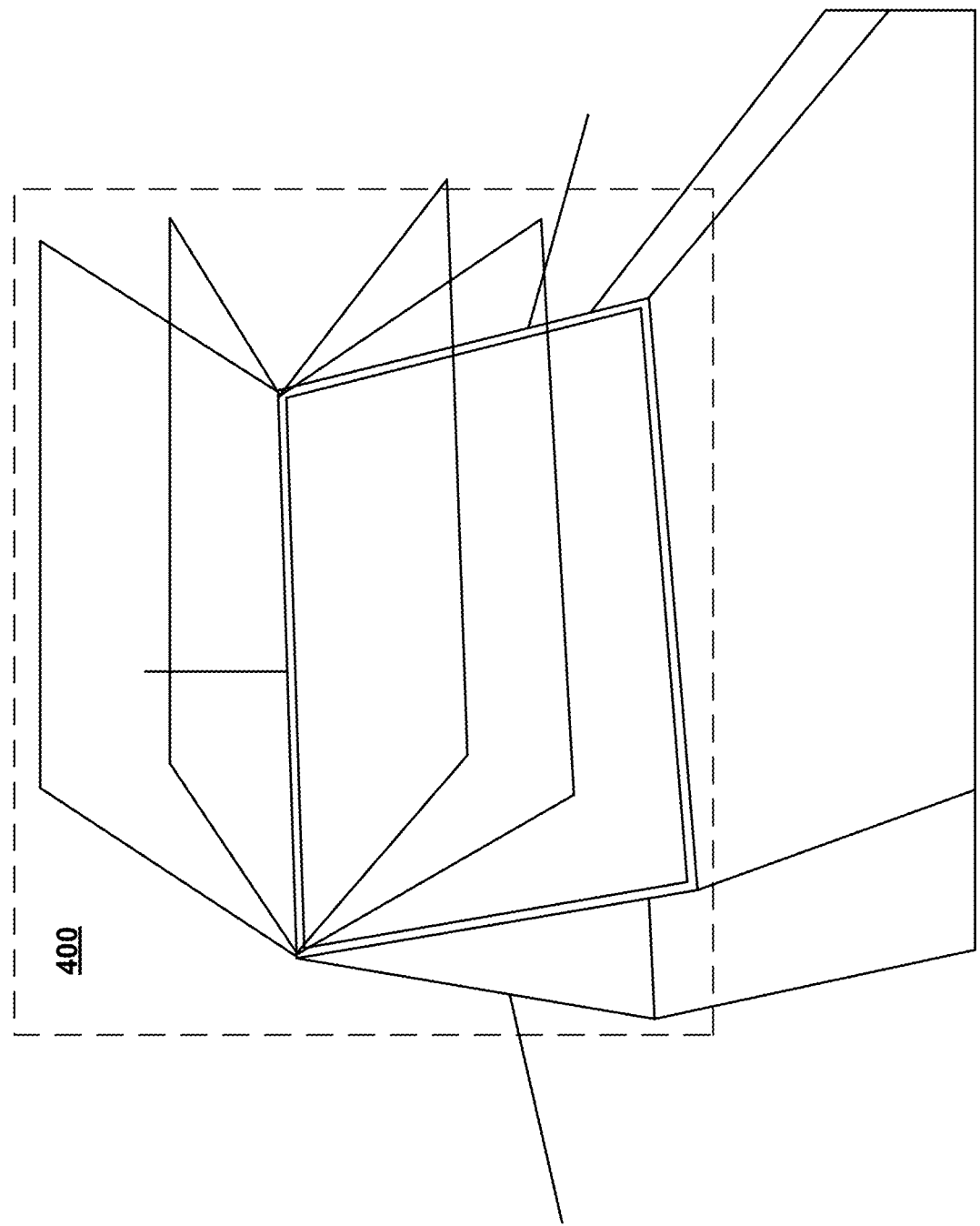
FIG. 4 is a block diagram illustrating a folding action of an example device.

For instance, FIG. 4 illustrates an example of device 400, which is an example of device 300 of FIG. 3. FIG. 4 illustrates an example of the folding action by which device 400 may operate as a single, foldable panel which folds in half, with each half operable as a separate screen.

Figure 5:
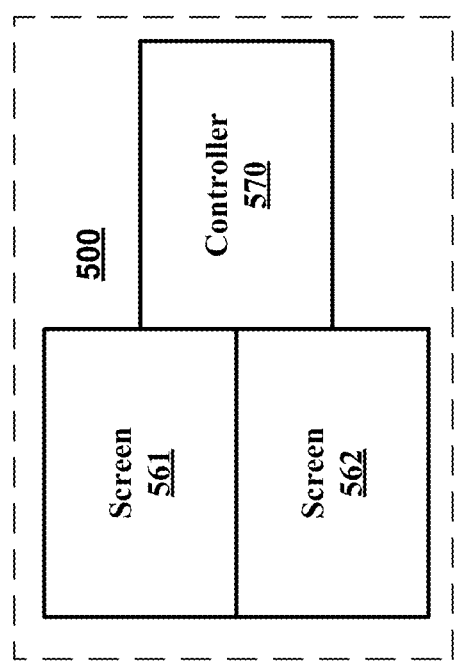
FIG. 5 is a block diagram illustrating an example of a device.

FIG. 5 is a block diagram illustrating an example of a device 500. Device 500 may include screen 561, screen 562, and controller 570.

In some examples, screen 562 is physically coupled to screen 561, and can be placed in multiple different configurations, including at least one configuration in which screen 561 and screen 562 are both facing the same direction.

Controller 570 may be disposed inside screen 561, disposed inside screen 562, or may have one portion inside screen 561 and another portion inside screen 562. In some examples, one portion of controller 570 is disposed inside screen 561, another portion of controller 570 is disposed inside screen 562, and the two portions are connected through a hinge that physically couples screen 561 to screen 562. In other examples, controller 572 may be separate from screen 561 and screen 562. In some examples, controller 570 may be a processor or include a processor, such as an example of processing circuit 210 of FIG. 2. The processor may include a microcontroller, a CPU, and/or the like.

In some examples, controller 570 executes an operating system (OS) and two or more applications. The OS may maintain a registry of context schemas. Each context schema may have an input and an output. The applications may send context schema outputs and receive schema context inputs. The OS may forward the context schema inputs and outputs after first verifying the context schema inputs and outputs with the registry and any relevant security policies. The applications may use context schema inputs provided by other applications to provide view augmentation for the multi-screen environment provided by device 500, such as those given in the examples discussed above with regard to FIG. 3.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 6:
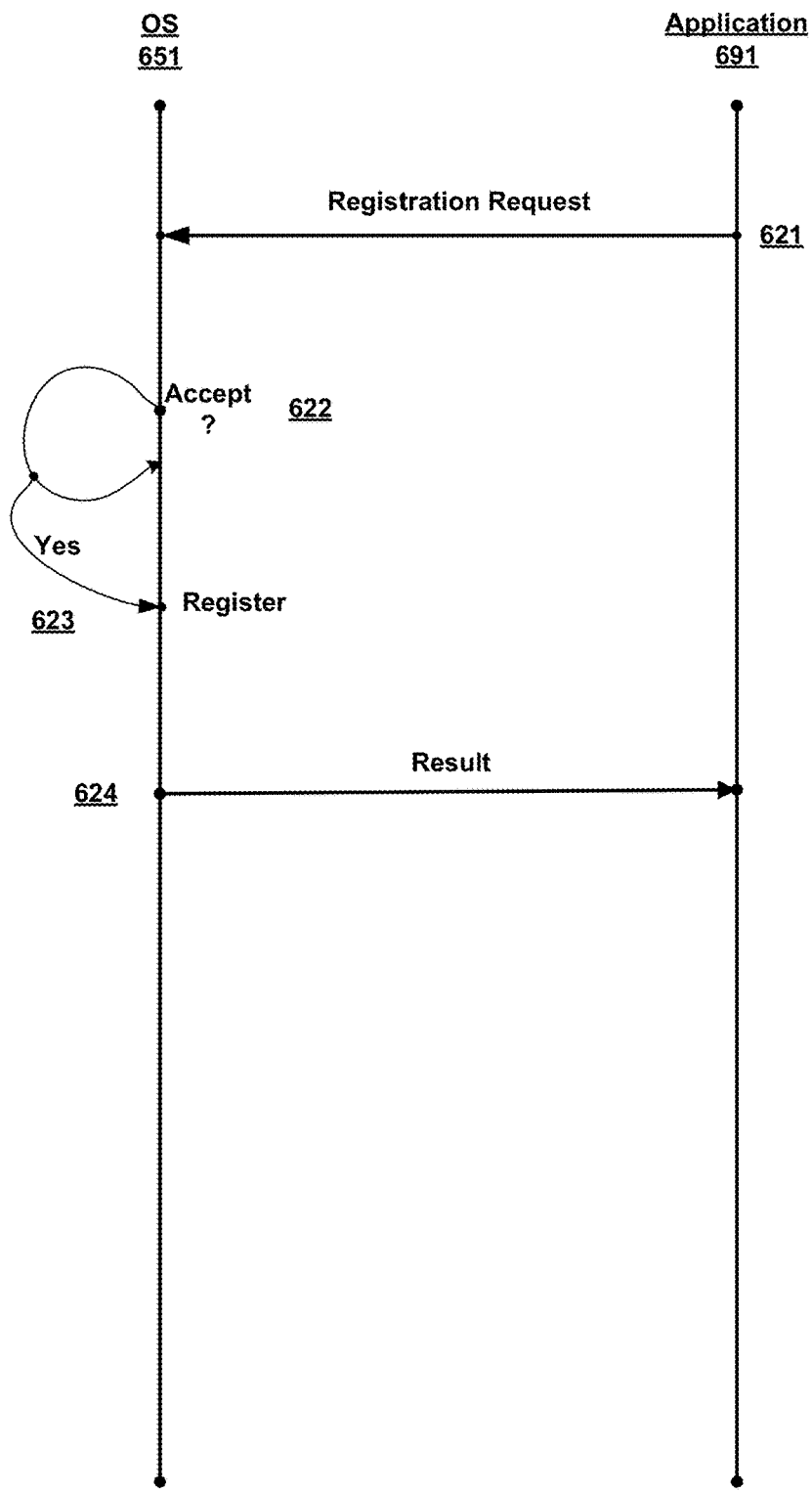
FIG. 6 is an example dataflow for a process of registering a context schema.

FIG. 6 is a diagram illustrating dataflow in device (600) that may be employed as an example of the device of FIG. 2, FIG. 3, FIG. 4, and/or FIG. 5. In some examples, device 600 includes OS 651 and app 691. FIG. 6 illustrates a process by which context schema may be registered.

In the illustrated example, first, step 621 occurs. At step 621, in some examples, a registration request is communicated from app 691 to OS 651. In some examples, the registration request is sent during the installation of app 691 or shortly after the installation of app 691. In other examples, the registration request at some other suitable time. In some examples, the registration request is a request to register a context schema in the context schema registry.

Examples of context schemas may also include locations, search terms, restaurants, people, price information, and/or the like. Examples of context schemas may also include an activity that the user is performing, such as that the user is traveling in a particular area, is browsing food in a particular location, is searching for lunch options, and/or the like. In some examples, each context schema includes defined inputs and outputs for the context schema. In some examples, a context schema input is a request that can be from an application requesting information related to the context schema as defined by the context schema. In some examples, a context schema output is information associated with a context schema that may be provided to other applications in a manner defined by the context schema.

In some examples, the context schema registry includes a global ledger stored in a local database. In other examples, the ledger is not maintained on the local system, and may instead be stored in the cloud or on a separate system.

As shown, decision step 622 occurs next in some examples. At decision step 622, in some examples, OS 651 makes a determination as whether or not to accept the registration request. The determination may be based on security policies, user-selected permissions settings, other user-selected settings, and/or the like. In some examples, the settings may be requested of the user when the app 691 is installed. For instance, when an app is first installed, the user may be asked whether the app has permission to contact other applications. In other examples, the user may be asked whether the app has permission to contact other applications the first time the app attempts to contact other applications.

In some examples, if the determination at step 622 is positive, the process proceeds to step 623, where the requested context schema is added to the context schema registry. The context schema registry may be/include a ledger or the like. In some examples, the ledger is a global ledger that is stored in a local database for the OS. The process then proceeds to step 624 in some examples. In some examples, if the determination at step 623 is negative, the requested context schema is not added to the context schema registry, and the process next proceeds to step 624.

At step 624, in some examples, an acceptance/denial (e.g., the result) of the registration request is communicated from OS 651 to app 691. For example, if the registration request was accepted, a success message may be communicated from OS 651 to app 691.

The process illustrated in FIG. 6 may be repeated multiple times, including possibly multiple times for a particular application, and may also be repeated for multiple applications. As a result of multiple iterations of the process of FIG. 6, OS 651 may maintain a registry that includes context schemas, where each context schema is associated with view augmentation in a multiscreen environment.

Figure 7:
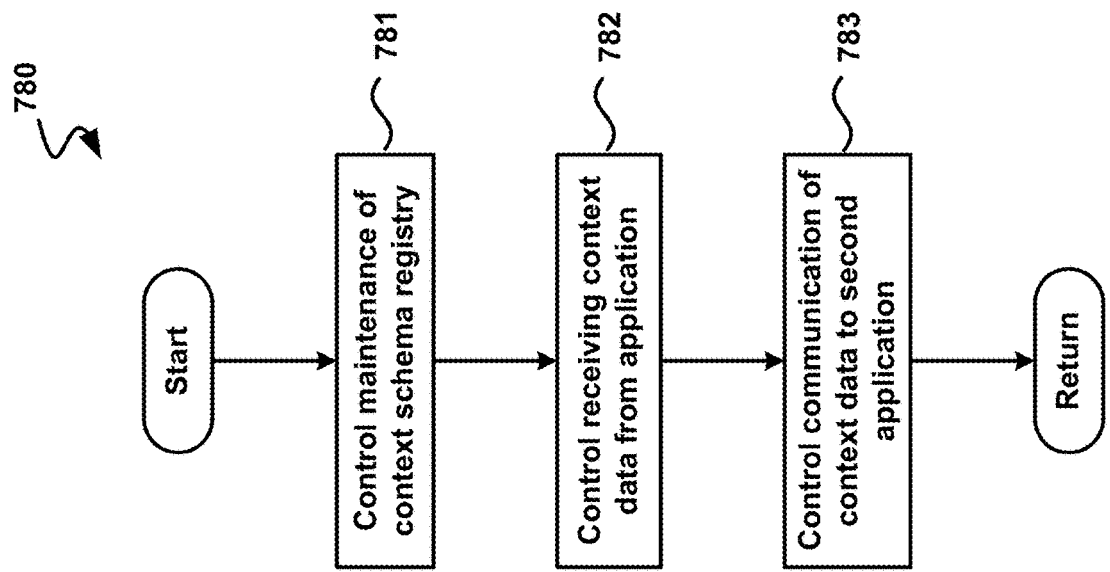
FIG. 7 is a flow diagram illustrating another example process.

FIG. 6 shows an example process for registering context schemas. FIG. 7 shows a process by which the OS may process context schema inputs and outputs based on the context schema registry.

FIG. 7 is a flow diagram illustrating an example process (780) that may be performed, e.g., by the operating system of the device of FIG. 6 and/or of the controller/processor of device of FIG. 2, FIG. 3, FIG. 4, and/or FIG. 5.

In the illustrated example, step 781 occurs first. At step 781, in some examples, a maintenance of a registry is controlled. The registry may include a plurality of context schemas. Each context schema in the plurality of context schemas may include a context schema input and a context schema output. In some examples, the registry is or includes a ledger. In some examples, at step 781, a ledger is stored, where the ledger includes a plurality of context schemas, and where each context schema in the plurality of context schemas includes a context schema input and a context schema output. As shown, step 782 occurs next in some examples.

At step 782, in some examples, receiving of context data from a first application is controlled. In some examples, the context data includes at least one of a context schema input that is associated with view augmentation in a multiscreen environment or a context schema output that is associated with view augmentation in a multiscreen environment.

As shown, decision step 783 occurs next in some examples. At step 783, in some examples, communication of the context data to at least a second application is controlled. The process may then proceed to a return block, where other processing is resumed.

Figure 8:
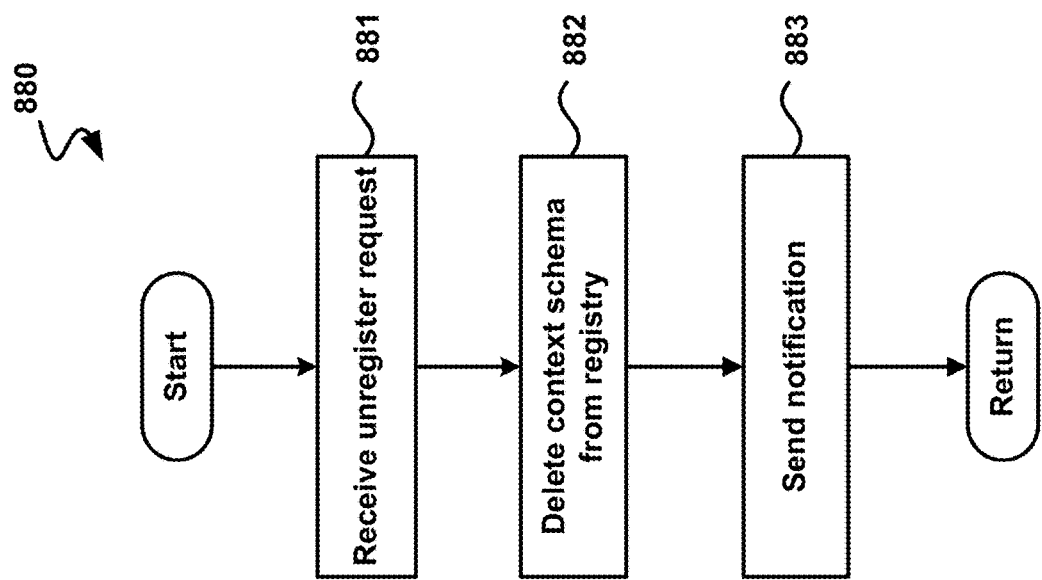
FIG. 8 is a flow diagram illustrating an example process of unregistering a context schema.

Context schema can be added to a context schema registry as shown in FIG. 6, used as shown in FIG. 7, and may also be unregistered, as shown in FIG. 8. For example, a context schema may be unregistered when the application that registered the context schema is uninstalled, upon user request, for security reasons, and/or the like.

FIG. 8 is a flow diagram illustrating an example process (880) for unregistering a context schema that may be performed, e.g., by the operating system of the device of FIG. 6 and/or of the controller/processor device of FIG. 2, FIG. 3, FIG. 4, and/or FIG. 5.

In the illustrated example, step 881 occurs first. At step 881, in some examples, a request to unregister a context schema is received. The unregister request could originate from a security policy, a user request, as part of an uninstall of an application, and/or the like. As shown, step 882 occurs next in some examples. At step 882, in some examples, all entries corresponding to the context schema in the request are deleted from the registry. As shown, step 883 occurs next in some examples. At step 883, in some examples, a notification of successfully unregistering the context schema is sent. The process may then proceed to a return block, where other processing is resumed.

The process illustrating in FIG. 8 may be repeated multiple times, including possibly multiple times for a particular application, and may also be repeated for multiple applications.

Figure 9:
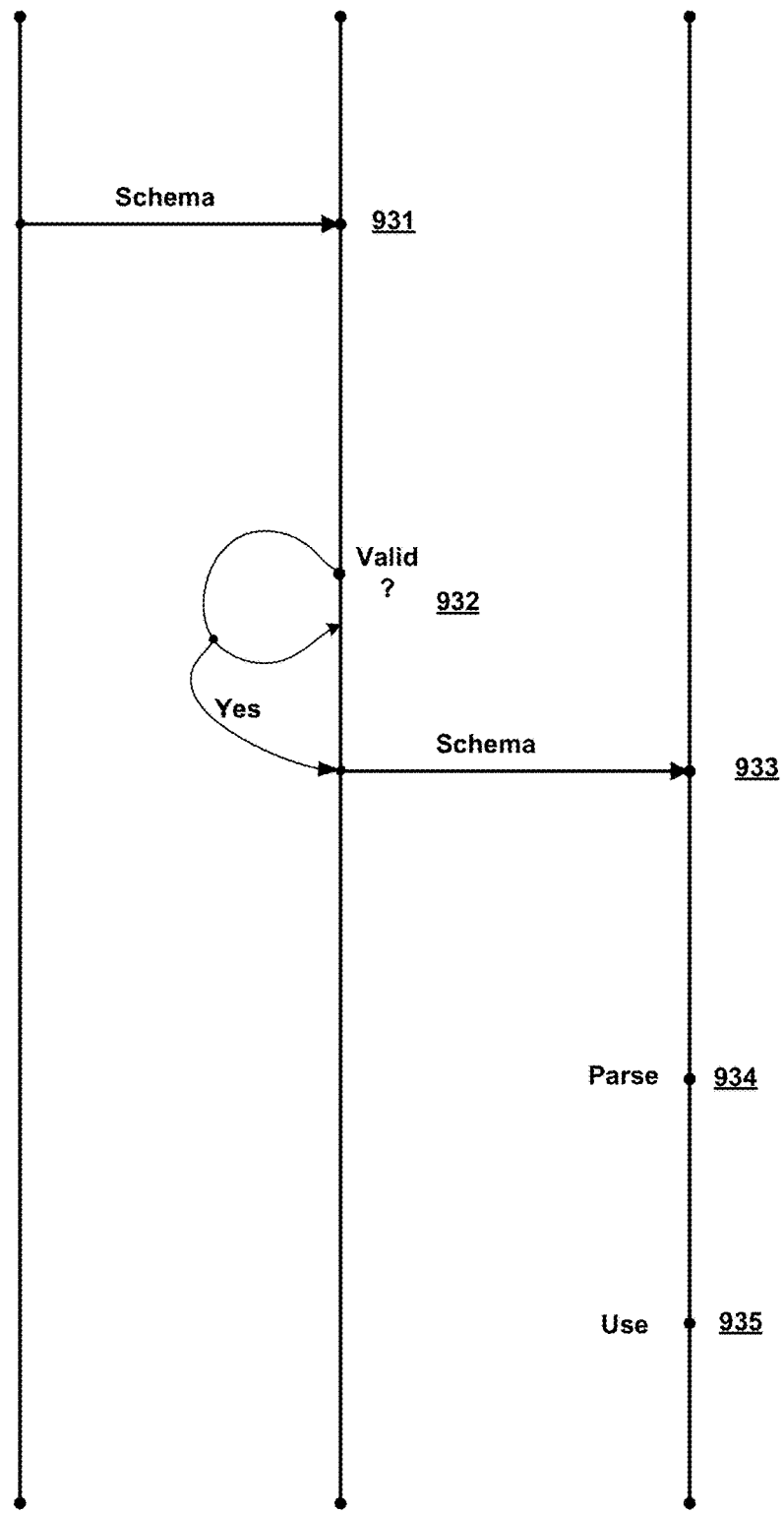
FIG. 9 is an example dataflow illustrating another example process.

FIG. 9 is a diagram illustrating dataflow in device (900). In some examples, device 900 includes cryptlet OS 951, app 991, and app 992. As discussed elsewhere, some examples include more than two apps.

In the illustrated example, first, step 931 occurs. At step 931, in some examples, app 991 communicates a context schema output to OS 951. In some examples, the context schema output is communicated by app 991 calling an API, building the data context of the context schema output, contacting OS 991, and then sending the context schema output to OS 991 via the API. In some examples, the context schema output is information in the context schema that may be useful to other apps, such as the location of the user, nearby relevant locations such as nearby restaurants or stores, information associated with a nearby location such as price information or deal information, a search term input by the user, information associated with an alert such as a news alert, stock alert, a deal alert, a social media alert, and/or the like.

As shown, step 932 occurs next in some examples. At step 932, in some examples, OS 951 makes a determination as to whether the context schema output is valid based, at least in part, on the context schema registry. For example, the OS may determine whether the context schema output is valid based on the definition of the corresponding context schema in the context schema registry. The OS may also determine whether the context schema output is allowed to be forwarded based on security policies. The OS may also determine whether the context schema output is allowed to be forwarded based on user-selected settings. The user may have selected various settings associated with context schema, including global settings associated with context schema, as well as settings for particular apps that may be selected when the app is installed, or changed at a later time if desired by the user. For example, when an app is installed, the user may be asked whether the user gives permission for that app to communicate with other apps.

If the determination at step 932 is positive, then step 933 occurs next in some examples. At step 933, in some examples, a context schema input is communicated from OS 951 to at least app 952. In some examples, OS 951 may communicate the context schema input to several apps, such as each app that has subscribed to the context schema input, as indicated by the context schema registry, and which should also receive the context schema input based on policies and settings.

As shown, step 934 occurs next in some examples. At step 934, in some examples, app 992 parses the context schema output. As shown, step 935 occurs next in some examples. At step 935, in some examples, app 992 uses the context schema input. The manner in which app 992 uses the context schema input may vary depending on the exact circumstances. In some examples, app 952 will do nothing with the context schema input. In some examples, app 992 uses the context schema input to provide view augmentation in a multiscreen environment.

As one example, a mapping application may be providing a navigation application on one screen, and may provide a context schema output indicating the current location of the user. The "Gas Buddy" app could receive this information, and launch on a second screen to provide contextual information about gas prices nearby.

As another example, the information may be a search term. The search term could be sent to the Twitter app, and the Twitter app may launch in the second screen, showing the latest tweets related to the search term.

Figure 10:
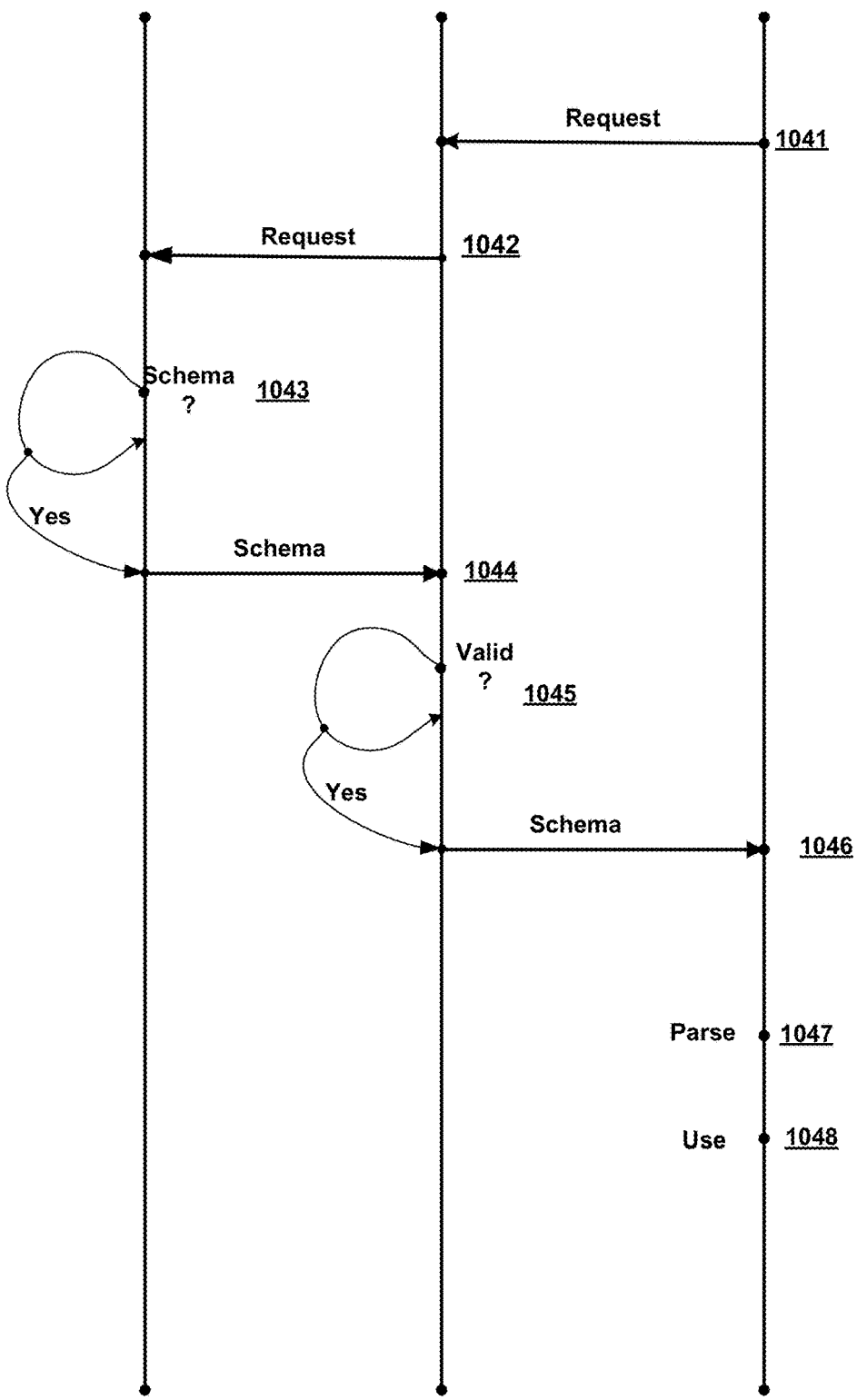
FIG. 10 is an example dataflow illustrating yet another example process.

FIG. 10 is a diagram illustrating dataflow in device (1000). In some examples, device woo includes cryptlet OS 1051, app 1091, and app 1092. As discussed elsewhere, some examples include more than two apps.

In the illustrated example, first, step 1041 occurs. At step 1041, in some examples, app 1091 communicates a request for a context schema input to OS 1051. For example, the request could be a request for information about a location or multiple location or a particular business or multiple businesses, such as price information, location information, deal information, or review information associated with the business, or the like; a request for the location of the user; and/or the like.

As shown, step 1042 occurs next in some examples. At step 1042, in some examples, OS 1051 communicates a request to each app that subscribes as a sender of outputs for the context schema for relevant context schema. In some examples, the request from app 1091 may have been limited to a particular app or set of apps, in which case only the apps requested receive the request. In some examples, the apps to which OS 1051 communicates the request include app 1092. As shown, step 1043 occurs next in some examples. At step 1043, in some examples, app 1092 determines whether or not app 1092 has a context schema output corresponding to the request. If so, in some examples, the process proceeds to step 1044.

At step 1044, in some examples, app 1092 communicates a context schema output responsive to the request to OS 1051. In some examples, the context schema output is communicated by app 1092 calling an API, building the data context of the context schema output, contacting OS 1092, and then sending the context schema output to OS 1051 via the API.

As shown, step 1045 occurs next in some examples. At step 1045, in some examples, the OS makes a determination as to whether the context schema output is valid based, at least in part, on the context schema registry. For example, the OS may determine whether the context schema output is valid based on the definition of the corresponding context schema in the context schema registry. The OS may also determine whether the context schema output is allowed to be forwarded based on security policies. The OS may also determine whether the context schema output is allowed to be forwarded based on user-selected settings. The user may have selected various settings associated with context schema, including global settings associated with context schema, as well as settings for particular apps that may be selected when the app is installed, or changed at a later time if desired by the user. For example, when an app is installed, the user may be asked whether the user gives permission for that app to communicate with other apps.

If the determination at step 1045 is positive, then step 1046 occurs next in some examples. At step 1046, in some examples, a context schema input is communicated from OS 1051 to app 1091.

As shown, step 1047 occurs next in some examples. At step 1047, in some examples, app 1091 parses the context schema output. As shown, step 1048 occurs next in some examples. At step 1048, in some examples, app 1091 uses the context schema input. The manner in which app 1091 uses the context schema input may vary depending on the exact circumstances. In some examples, app 1052 will do nothing with the context schema input. In some examples, app 1091 uses the context schema input to provide view augmentation in a multiscreen environment.

As one example, a mapping application may display navigation information on one screen. The mapping application may request information about a nearby place or business, such as a restaurant that is detected to be near. The mapping application may send a request for this information to the OS. The OS may then forward the request to relevant apps. An app associated with information on the restaurant may then send information regarding the restaurant to the OS, which in turns sends the information to the mapping application. The mapping application may then open a second screen showing a live view that includes AR markers, which include the retrieved information from the app that provided the restaurant information.

As another example, a user may be using a music app, and may request from the Twitter app whether there are any tweets related to the currently playing music. The request may be sent to the OS, which may then communicate the request to the Twitter app. The Twitter app may determine whether there are any relevant tweets. If so, the Twitter app may communicate a corresponding context schema output to the OS. The OS may then communicate the information as a corresponding context schema input. The music app may then display the tweets within the music app.

In some examples, in any of the various cases, multiple applications may register for the same context notifications. In some examples, an interface allows for a user to select and switch between conflicting views. If competing applications are providing data for an application, the application can handle conflicts as it sees fit (e.g., multiple data layers, user input, etc.).

As discussed above, an application can use context data received from other applications in various ways in different examples.

For instance, in some examples, an application may automatically or programmatically augment an application with additional views from one or more other applications on a second screen. For instance, while a music app is playing music and running one screen, the "Twitter" app can launch to show the artist's twitter feed on another screen.

In other examples, an application can provide view augmentation with additional data provided by one or more other applications on a second screen. For instance, while a music app is playing music and running one screen, the music app can accept data from "Twitter" to show relevant tweets in the music app.

In other examples, an application may display information on one screen while showing auxiliary data on a second screen in the application. For instance, in some examples, while a mapping application is displaying a "compass mode" on a first screen, the second screen displays an AR view of what is in front of the user, with additional information overlaid on second screen. As another example, the Facebook app may be displayed on a first screen. While browsing the Facebook app, the Facebook app can display a stream of the users 'friends' activity on the second screen based information received from other apps.

In other examples, an application can register for a system capability enabling cross-app context sharing allowing for notification of and information flow between applications enabling these scenarios. For example, if an application registers for location context, the application gets notified for location-related user activity.

AR views, including AR camera views, may be augmented in a variety of different ways. For example, if a physical document is viewed by the camera, and the document is recognized as a Word document, then Word can launch and appear side-by-side with the document. If a business is displayed in the camera view, information about the business received from other apps can be displayed in the AR view, or as separate information on a second screen.

In some examples, applications that are subscribed to receive information from a particular context can request information at a particular time, or can be subscribed to always receive information on that context when it is provided.

In some examples, the apps that are publishing data might not necessarily have to have been launched already. For instance, the apps may have background tasks that are running. When the app is asked for information, a background task may provide the requested information.

In some examples, context schema inputs, outputs, or requests may include additional information that is passed. For example, in the case of a search action, the search query may be included as an optional piece of data. Additional permissions and settings may also be included. Information about the desired mode may also be included. Examples of mode may include that an application wishes to receive information, but that the application to which the request is sent should not launch. The mode may include information about which apps should receive information and/or act based on the provided context schema. For example, it may be desired to launch a particular application, or the default application of a particular type as determined by the user. For example, in response to a context schema, it may be desired that the default social media application launch or receive information, rather than having more than one social media application launch.

One example of different modes is that a mapping application may be providing navigation on one screen, and may have a context schema for gas prices to pass to the Gas Buddy application. In one mode, the mapping application may provide a context schema to the Gas Buddy application, and the Gas Buddy application launches on a second screen. In another mode, in some examples, the mapping application requests gas price information from the Gas Buddy Application, and the mapping application providing its own UI on a second screen, making use of the information from the Gas Buddy application among other information. The intended mode may be passed along by the mapping application with the context schema or request for context schema.

Figure 11A:
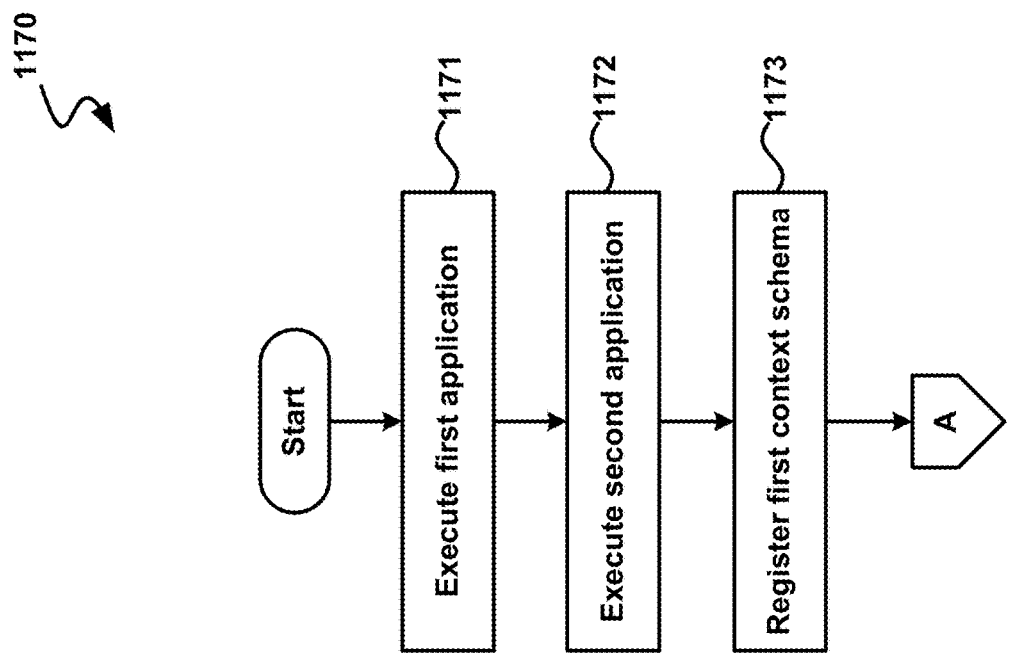
FIGS. 11A-11B are a flow diagram illustrating another example process, in accordance with aspects of the present disclosure.
Figure 11B:
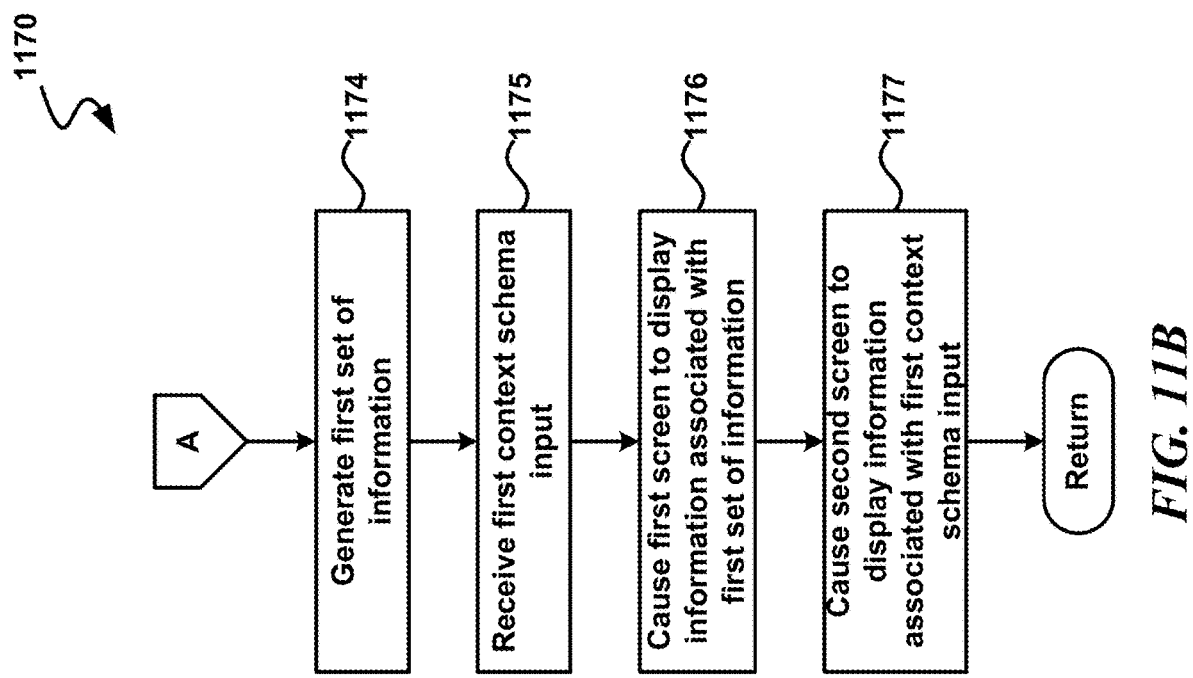

FIGS. 11A-11B are a flow diagram illustrating an example process (1170) that may be performed, e.g., by controller 570 of device FIG. 5. The controller may be part of a device that also includes a first screen, and a second screen that is separate from the first screen. As discussed elsewhere, some examples include more than two screens.

In the illustrated example, step 1171 occurs first. At step 1171, in some examples, a first application is executed. As shown, step 1172 occurs next in some examples. At step 1172, in some examples, a second application is executed. As shown, step 1173 occurs next in some examples. At step 1173, in some examples, a first context schema is registered. As shown, step 1174 occurs next in some examples.

At step 1174, in some examples, a first set of information that is associated with the first context schema is generated via the first application. As shown, step 1175 occurs next in some examples. At step 1175, in some examples, at least a first context schema input of the first context schema that originates from the second application is received via the first application. As shown, step 1176 occurs next in some examples. At step 1176, in some examples, the first screen is caused to display information that is associated with the first set of information. As shown, step 1177 occurs next in some examples. At step 1177, in some examples, the second screen is caused to display information that is associated with the first context schema input.

The process may then proceed to a return block, where other processing is resumed.

For instance, in some examples, the first application is a mapping application, and the first set of information generated by the first application at step 1174 maybe be navigation information, wherein mapping application causes information associated with the mapping application to be displayed on the first screen at step 1176. In some examples, the second application is a restaurant application, and the first context schema input received by the mapping application at step 1175 may include restaurant information received from the restaurant application. At step 1177, the mapping application may provide a live view on the second screen that includes AR markers, which includes information from the first context schema input, including the retrieved restaurant information from the restaurant app.

As another example, the first application is the "Gas Buddy" application, and the first set of information provided at step 1174 may include gas price information. In some examples, the second application is a mapping application, and at step 1175, the "Gas Buddy" application may receive information about the current location of the user as the first context schema input that originates from the mapping application. At steps 1176 and 1177, the mapping application provides a navigation display on one screen (step 1177) while the gas buddy application provides gas price information on the other screen (step 1176).

As another example, the first application is a music app, and the first set of information includes music information that is provided by the music app at step 1174. In some examples, the second application is the Twitter application, and at step 1175, the music app may receive a context schema input that includes, from the Twitter application tweets relevant to the music that is current being played by the music application. At step 1176, the music app may provide information associated with the music information the first screen. At step 1177, either the music app or the Twitter, in various examples, may provide the relevant tweets on the second screen.

Conclusion

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
   a device, including:
   a first screen;
   a second screen that is separate from the first screen; and
   a controller that is configured to perform actions, including:
   executing a first application;
   executing a second application;
   registering a first context schema, wherein the first context schema includes at least one of: a physical location, a search term, a place, price information, or a person;
   generating, via the first application, a first set of information that is associated with the first context schema;
   receiving, via the first application, at least a first context schema input of the first context schema that originates from the second application;
   causing the first screen to display information that is associated with the first set of information; and
   while causing the first screen to display the information that is associated with the first set of information, automatically causing a view on the second screen to change to display information that is associated with the first context schema input responsive to receiving the first context schema input.

2. The apparatus of claim 1, wherein causing the first screen to display information that is associated with the first set of information includes displaying a map display, and wherein causing the second screen to display information that is associated with the first context schema input includes displaying information associated with at least one location on the map display.

3. The apparatus of claim 1, wherein a search is made with a search term on the first screen, and wherein causing the second screen to display information that is associated with the first context schema input includes displaying information associated with the search term.

4. The apparatus of claim 1, wherein the second screen is physically coupled to the first screen in such a way that the first and second screen are foldable into a plurality of different physical configurations, including a physical configuration in which the first screen and the second screen are side-by-side.

5. The apparatus of claim 1, wherein causing the first screen to display information that is associated with the first set of information includes using the first application to provide a display based on the first application on the first screen, and wherein causing the second screen to display information that is associated with the first context schema input includes augmenting the view provided on the first screen with an additional view from the second application on the second screen.

6. The apparatus of claim 1, wherein causing the first screen to display information that is associated with the first set of information includes using the first application to provide a display based on the first application on the first screen, and wherein causing the second screen to display information that is associated with the first context schema input includes augmenting the view provided on the first screen with information provided on the second screen by the first application that includes information from the second application.

7. The apparatus of claim 1, the actions further including:
sending a first registration request to register the first context schema from the first application to an operating system;
receiving, via the first application, a response to the first registration request from the operating system;
sending a second registration request to register a second context schema from the second application to the operating system;
receiving, via the second application, a response to the second registration request from the operating system.

8. A method, comprising:
executing a first application;
executing a second application;
registering a first context schema;
generating, via the first application, a first set of information that is associated with the first context schema;
receiving, via the first application, at least a first context schema input of the first context schema that originates from the second application, wherein the first context schema includes at least one of: a physical location, a search term, a place, price information, or a person;
causing a first screen to display information that is associated with the first set of information; and
while causing the first screen to display the information that is associated with the first set of information, automatically causing a view on a second screen that is separate from the first screen to display information that is associated with the first context schema input responsive to receiving the first context schema input.

9. The method of claim 8, further comprising:
sending a first registration request to register the first context schema from the first application to an operating system;
receiving, via the first application, a response to the first registration request from the operating system;
sending a registration request to register a second context schema from the second application to the operating system;
receiving, via the second application, a response to the second registration request from the operating system.

10. A method, comprising:
controlling storage of a ledger that includes a plurality of context schemas, wherein each context schema in the plurality of context schemas includes a context schema input and a context schema output, wherein a first context schema of the plurality of context schemas includes at least one of: a physical location, a search term, a place, price information, or a person;
controlling receiving, from a first application, context data, including at least one of a context schema input of the first context schema that is associated with view augmentation in a multiscreen environment or a context schema output of the first context schema that is associated with view augmentation in a multiscreen environment; and
controlling communicating the context data to at least a second application, wherein the second application is separate from the first application.

11. The method of claim 10, further comprising:
receiving a request to unregister a requested context schema; and
deleting the requested context schema from the ledger.

12. The method of claim 10, wherein the context data is received based on a defined application programming interface (API) call from the first application.

13. The method of claim 10, wherein the ledger includes a global ledger stored in a local database.

14. The method of claim 10, further comprising:
determining whether the context data is valid based, at least in part, on the ledger, wherein controlling communicating the context data to at least a second application is performed in response to determining that the context data is valid.

15. The method of claim 14, wherein determining whether the context data is valid is further based on permissioning settings.

16. The method of claim 14, further comprising, in response to determining that the context data is valid, forwarding the context data to a third application, wherein the second application and the third application are each subscribed to the context schema associated with the context data.

17. The method of claim 10, further comprising:
receiving a registration request for a requested context schema;
making a determination as to whether to accept the requested context schema; and
in response to determining to accept the requested context schema, adding the requested context schema to the ledger.

18. The method of claim 17, further comprising, after adding the requested context schema to the ledger, sending a success message.

19. The method of claim 17, wherein the determination as to whether to accept the requested context schema is based, at least in part, on a security policy.

20. The method of claim 17, wherein the determination as to whether to accept the requested context schema is based, at least in part, on user-selected permissioning settings.

* * * * *